(12) United States Patent
Toda et al.

(10) Patent No.: US 7,690,846 B2
(45) Date of Patent: Apr. 6, 2010

(54) BEARING DEVICE AND METHOD OF MANUFACTURING THE BEARING DEVICE

(75) Inventors: Kazutoshi Toda, Osaka (JP);
Shinichirou Kashiwagi, Osaka (JP);
Daisaku Tomita, Osaka (JP)

(73) Assignee: Koyo Seiko Co., Ltd., Osaka (JP)

( * ) Notice: Subject to any disclaimer, the term of this patent is extended or adjusted under 35 U.S.C. 154(b) by 195 days.

(21) Appl. No.: 10/497,041

(22) PCT Filed: Mar. 6, 2003

(86) PCT No.: PCT/JP03/02625
§ 371 (c)(1),
(2), (4) Date: May 28, 2004

(87) PCT Pub. No.: WO03/074891
PCT Pub. Date: Sep. 12, 2003

(65) Prior Publication Data
US 2005/0078901 A1    Apr. 14, 2005

(30) Foreign Application Priority Data
Mar. 6, 2002    (JP)    ............................. 2002-060263

(51) Int. Cl.
*F16C 33/32*    (2006.01)
*F16C 13/00*    (2006.01)
*B23P 17/00*    (2006.01)
*B21D 53/10*    (2006.01)

(52) U.S. Cl. ........................... 384/492; 384/544; 29/898
(58) Field of Classification Search ................ 384/492, 384/544, 589; 29/898, 898.04
See application file for complete search history.

(56) References Cited

U.S. PATENT DOCUMENTS 3,846,183 A  *  11/1974  Henry ........................ 148/581
4,753,691 A  *   6/1988  Tarui et al. .................. 148/505
2002/0012486 A1*  1/2002  Ishida et al. ................. 384/544

FOREIGN PATENT DOCUMENTS

JP          2002-21858          1/2002

OTHER PUBLICATIONS

Rockwell C (HRC)I to Vickers Hardness (Hv) Conversion Chart, http://www.taylorspecialsteels.co.uk/pages/main/conchart.htm.*
"Rockwell Scale", Wikipedia, http://en.wikipedia.org/wiki/Rockwell_Scale.*

* cited by examiner

*Primary Examiner*—Thomas R Hannon
*Assistant Examiner*—Justin Krause
(74) *Attorney, Agent, or Firm*—Jordan and Hamburg LLP (57) ABSTRACT

A bearing device is provided with a bearing ring and a shaft body that is made of carbon steel including pearlite having a cementite layer structure, and has an end portion caulked onto the bearing ring, and in this device, at least in the end portion of the shaft body, the layer gap of the cementite in the pearlite is made greater.

11 Claims, 7 Drawing Sheets

BEARING DEVICE AND METHOD OF MANUFACTURING THE BEARING DEVICE

FIELD OF THE INVENTION

The present invention relates to a rolling bearing device that is preferably applied to, for example, an axle and the like of a vehicle, and also relates to a manufacturing method thereof.

BACKGROUND OF THE INVENTION

The rolling bearing device for an axle is generally provided with an outer ring member that is attached to the vehicle body side and an inner ring member that is rotatably supported on the outer ring member so as to freely rotate around the bearing axis through two rows of rolling elements. This inner ring member is constituted by a hub shaft to which a wheel is attached and an inner ring bearing element that is fitted to the end portion of this hub shaft. The end portion of the hub shaft is deformed radially-outward to be caulked onto the end face of the inner ring bearing element so that the hub shaft is rotatably integrated with the inner ring bearing element. The hub shaft of this type is generally made of a steel material such as carbon steel. Such a steel material has a mixed structure of pearlite and pro-eutectoid ferrite.

When the end portion of the hub shaft is caulked onto the end face of the inner ring bearing element, minute cracks tend to occur on the caulked portion.

The present invention relates to the bearing device made of such a steel material having the mixed structure, and its object is to provide a bearing device that is free from minute cracks even when subjected to the caulking process, and a manufacturing method of such a bearing device.

DISCLOSURE OF THE INVENTION

A bearing device of the present invention includes a bearing ring and a shaft body that is made of carbon steel including pearlite having a cementite layer structure and has an end portion caulked onto the bearing ring, and in this device, at least in the end portion of the shaft body, the layer gap of the cementite in the pearlite is made greater.

Preferably, at least in the end portion of the shaft body, the average value of the layer gaps of the cementite is set in a range from not less than 0.15 μm to not more than 0.4 μm. The inventors have found that the generation of minute cracks is caused by the existence of cementite in the pearlite, and based upon this fact, have set the average value of the layer gaps of cementite to the above-mentioned range. With this arrangement, even when the end portion of the shaft body is caulked onto the bearing ring, the rate of occurrence of the minute cracks on its end portion is reduced to zero. Thus, it becomes possible to improve the supply rate of the bearing device as a product.

The average value of the layer gap of the cementite is preferably set in a range from not less than 0.15 μm to not more than 0.35 μm, with the end portion of the shaft body having a hardness of not less than 15 HRC. In this structure, the shaft body preferably has a sufficient hardness as a bearing device.

The bearing device of the present invention can be applied to axles of various vehicles such as automobiles, train vehicles and aircrafts. The bearing ring includes not only inner rings and outer rings of bearing devices, but also a hub wheel which is used in a bearing device having a constant velocity joint, with the outer ring end portion of the constant velocity joint being caulked onto the end face of the hub wheel. The shaft body includes a hub shaft of a vehicle-use rolling bearing or a shaft formed on an outer ring of a constant velocity joint that is allowed to rotate integrally with the hub wheel. With respect to the steel material to be used for the shaft body, carbon steel having a carbon content specified to 0.37% to 0.65% is used.

BEST MODE FOR CARRYING OUT THE INVENTION

Figure 1:
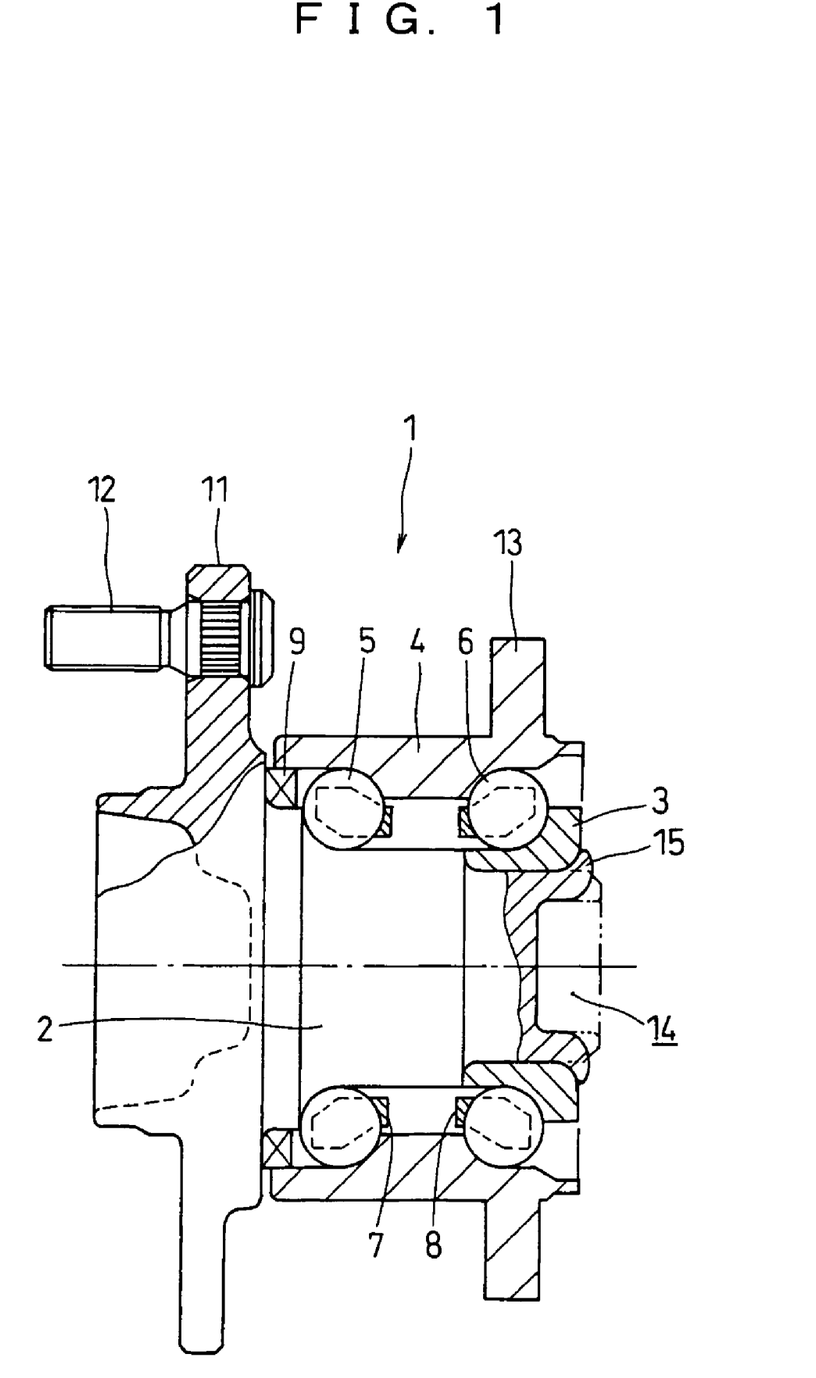
FIG. 1 is a cross-sectional view illustrating a schematic structure of a rolling bearing device in accordance with a preferred embodiment of the present invention.
Figure 2:
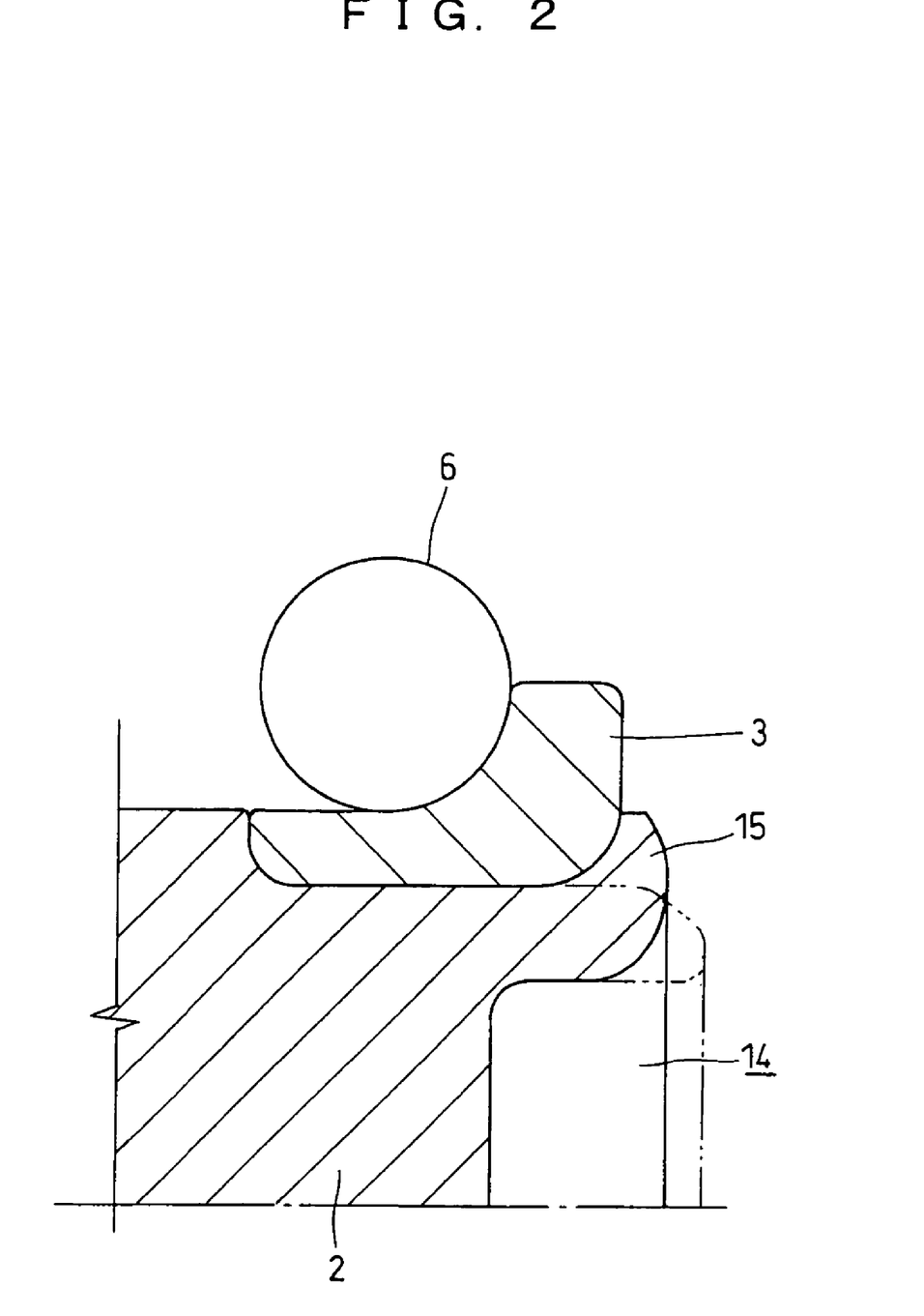
FIG. 2 is an enlarged cross-sectional view illustrating an essential portion thereof.

Referring to drawings, the following description will discuss a rolling bearing device in accordance with a preferred embodiment of the present invention in detail. A rolling bearing device applied to a bearing for a vehicle axle, more specifically, a rolling bearing device on the driven wheel side will be explained. FIG. 1 is a cross-sectional view illustrating the entire structure of the rolling bearing device, FIG. 2 is an enlarged cross-sectional view of a caulked portion, FIGS. 3(a) to 3(f) are schematic cross-sectional views illustrating the composition of the caulked portion, and FIG. 4 is an enlarged view illustrating the composition of pearlite. In FIG. 1, the right side in the axial direction shows a vehicle inner side, and the left side in the axial direction shows a vehicle outer side.

With respect to bearing rings that are placed radially inside and outside of a double row angular contact ball bearing with vertex of contact angles outside of bearing, a rolling bearing device 1, shown in the figures, is provided with two inner ring members 2 and 3, each having a row of inner ring raceway in the axial direction, and one outer ring member 4 having two rows of outer ring raceways in the axial direction.

The rolling bearing device 1 also has groups of balls 5 and 6 that are interposed between the respective raceways of the two inner ring members 2, 3 and the outer ring member 4 in two rows in the axial direction, snap cages 7 and 8 that respectively hold the groups of balls 5 and 6 of the respective rows, and a seal member 9 attached to the end. The one inner ring member 2 is made by a hub shaft that functions as a shaft body to which a brake disc, a wheel and the like are attached. The other inner ring member 3 is formed by an inner ring itself that is fitted to the outer periphery of this hub shaft 2. Hereinafter, the one inner ring member 2 and the other ring member 3 are referred to as a hub shaft 2 and an inner ring 3, respectively.

The hub shaft 2 and the inner ring 3 form a bearing ring placed on the inside in the radial direction of the bearing. The outer ring member 4 forms a bearing ring placed on the outside in the radial direction of the bearing. In this case, when the end portion of the hub shaft 2 is caulked onto the end face of the inner ring 3, the hub shaft 2 and the inner ring 3 may be referred to as the shaft member and the bearing ring, respectively.

The hub shaft 2 has a radially-outward hub flange 11, to which a brake disk and the like, not shown, are attached through hub bolts 12. The outer ring member 4 has a radially-outward mounting flange 13, and is non-rotatably supported on the vehicle side not shown through the use of this mounting flange 13.

A caulking-use concave portion 14 is formed into a cylindrical shape in the end portion on the vehicle inner side of the hub shaft 2. This cylindrical end portion on the vehicle inner side is deformed radially-outward to be caulked onto the outer end face of the inner ring 3. The end portion of the hub shaft 2, caulked in this manner, is referred to as a caulked portion 15. This caulked portion 15 allows the hub shaft 2 and the inner ring 3 to rotate integrally with each other so that a predetermined preload is applied to the inner ring 3.

As described above, the hub shaft 2 is compatibly used as one of the inner ring members of the bearing so that the rolling bearing device 1 constitutes a bearing device in which the hub shaft 2 and this bearing are integrally formed.

The following description will discuss features of the present embodiment in detail. The hub shaft 2 is made of carbon steel. With respect to the carbon steel, machine-structure-use carbon steel materials having a carbon content of 0.37% to 0.65% are selected, and among these, those classified as S55C based upon JIS standard are preferably selected. This S55C has a carbon content of 0.52% to 0.58%.

In the case of the carbon steel mentioned above, the metal structure has a mixed structure of pearlite 16 and pro-eutectoid ferrite. Further, as shown in FIG. 4, the pearlite 16 contains cementite 18 formed into layers. In the embodiment of the present invention, the average value of the layer gaps of this cementite 18, that is, lamella gaps, is set in a range from not less than 0.15 μm to not more than 0.35 μm. The following description will discuss the reason why the average value of the layer gaps of the cementite 18 is set to the range mentioned above.

Figure 3:
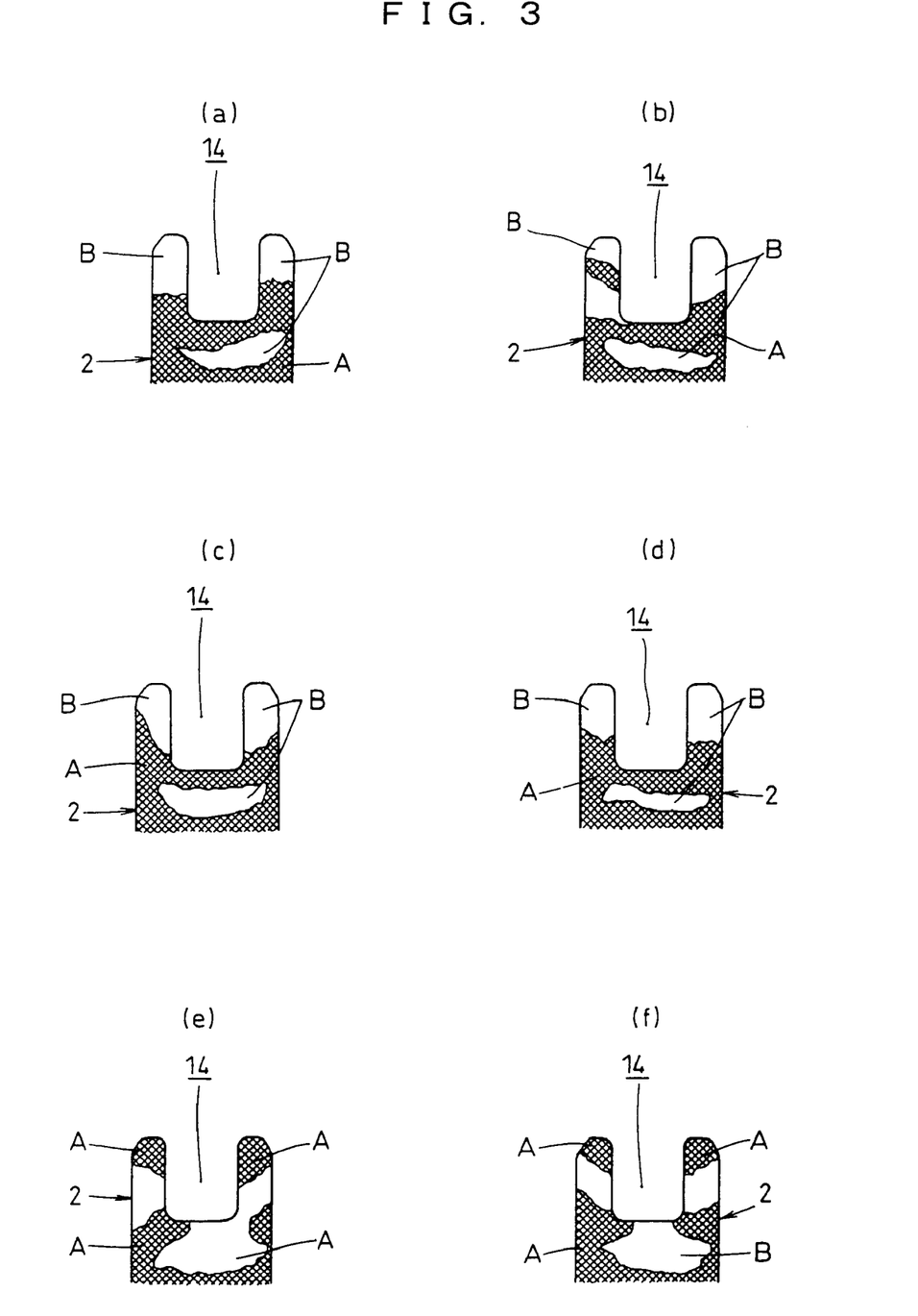
FIG. 3 is a cross-sectional view illustrating a hub shaft of each lot thereof.
Figure 4:
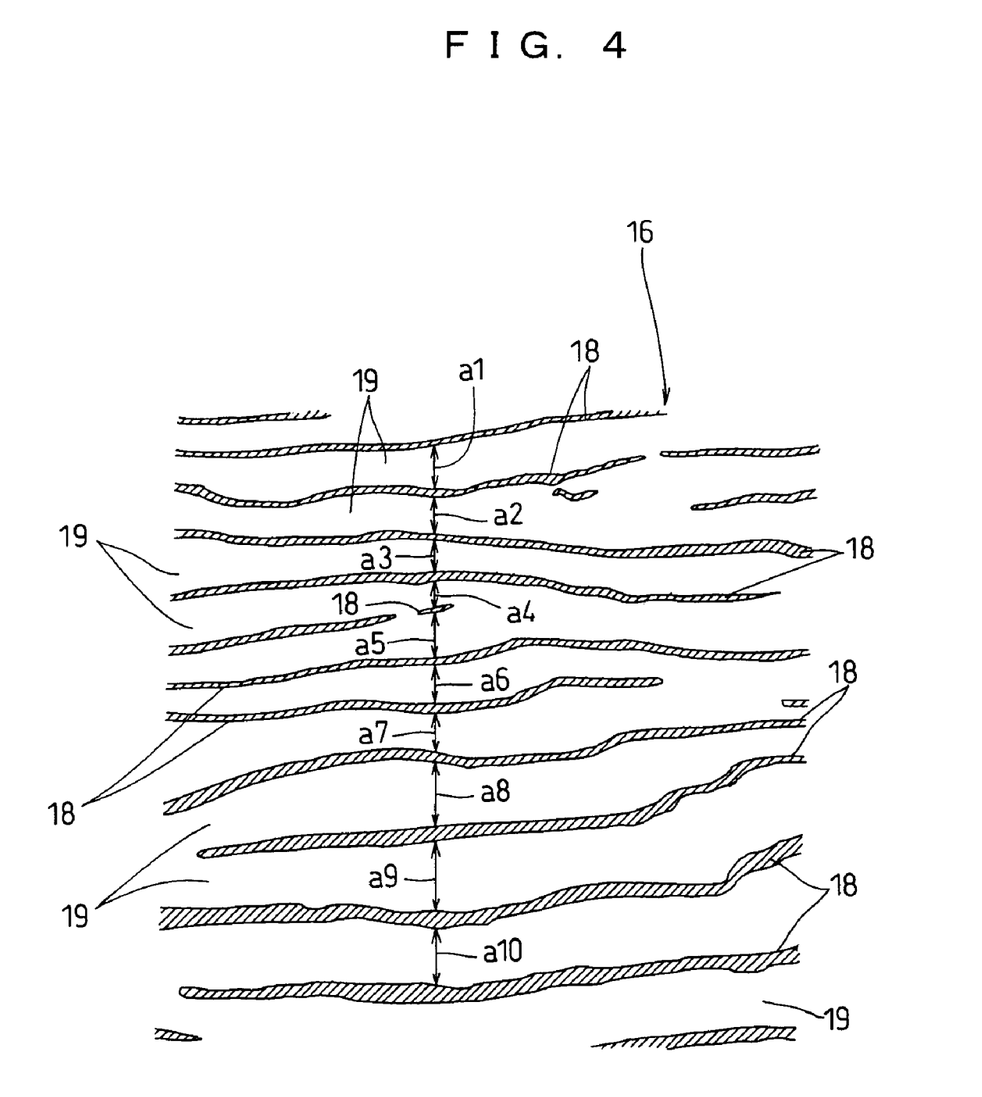
FIG. 4 is an enlarged cross-sectional view of pearlite thereof.

FIGS. 3(*a*) to 3(*f*) schematically show cross-sections corresponding to vehicle inner side portions of the hub shafts 2. These hub shafts 2 were manufactured through lot productions of a plurality of sets under a plurality of kinds of conditions. Each of FIGS. 3(*a*) to 3(*f*) show a state in which the hub shaft 2, cut in the radial direction, was boiled in an alkali solution of picric acid soda so that it was subjected to an etching process so as to make its metal structure observable. When the etching process is applied to the cross-section of the hub shaft 2, a black etched portion A (indicated by a cross-hatched portion in FIG. 3) and a white etched portion B (indicated by a portion having no cross-hatching) appear. With respect to each of these hub shafts 2, the presence of crack initiation on the caulked portion upon a caulking process was observed. As a result, the hub shafts 2 having minute cracks occurred on the caulked portion 15 and those having no cracks were observed. Here, the plurality of kinds of conditions refer to differences in the period of time required for the hub shafts 2 after a forging process to be cooled to a predetermined temperature (for example, room temperature). In other words, supposing that the annealing time of the hub shaft 2 shown in FIG. 3(*a*) is 1, the annealing time thereof shown in FIG. 3(*b*) is given as 1.2, the annealing time thereof shown in FIG. 3(*c*) is given as 1.3, and the annealing time thereof shown in FIG. 3(*d*) is given as 1.5. The annealing time thereof shown in FIGS. 3(*e*) and 3(*f*) is given as 0.5.

The respective hub shafts 2 shown in FIGS. 3(*a*) to 3(*d*) had no cracks generated on the caulked portion 15. Those hub shafts 2, shown in FIGS. 3(*e*) and 3(*f*), had minute cracks generated on the caulked portion 15. In FIGS. 3(*e*) and 3(*f*), a black portion (indicated by a cross-hatched portion A) was observed at the end portion of each of the hub shafts 2. This is caused by the fact that much pearlite 16 having cementite 18 with a small average lamella gap exists at the end portion of the hub shaft 2.

Here, the following description will discuss a difference in the metal structures between the black etched portion A and the white etched portion B that are shown in a cross-sectional view of the hub shaft 2 in FIG. 3.

When the black etched portion A was observed under a microscope, much pearlite 16 having cementite 18 with the average lamella gap of less than 0.15 μm existed. Moreover, when the white etched portion B was observed under a microscope, much pearlite 16 having cementite 18 with the average lamella gap in a range of 0.15 μm to 0.4 μm existed.

It is considered that such a difference is caused by the length of time required for the hub shaft 2 after the forging process to be cooled to a predetermined temperature. In other words, when the time required for the hub shaft 2 after the forging process to be cooled to a predetermined temperature (for example, room temperature) is short, pearlite 16 having a narrow lamella gap, that is, black etched portion A, tends to occur, while, when the length of time required for the hub shaft 2 after the forging process to be cooled to a predetermined temperature is set longer, much pearlite 16 having a wider lamella gap, that is, white etched portion B, tends to occur. Moreover, since the portion corresponding to the caulked portion 15 is located at a tip portion, this portion is easily cooled even in a short time; thus, black etched portion A tends to occur.

The results of these detailed examinations show that the layer gap of the cementite 18 located as layers in the pearlite 16 is closely related to the generation of cracks in the caulked portion 15; and it is found that, in particular, in the case when the layer gap of the cementite 18 in the pearlite 16 is narrow, there is a higher possibility of crack initiation in the caulked portion 15.

FIG. 4 is a schematic drawing showing a case in which the pearlite 16 was observed by a microscope with a higher magnification. This drawing shows that the pearlite 16 has a lamella structure in which ferrite 19 and cementite 18 are alternately located as layers.

In accordance with the results of examinations relating to the critical value of the crack initiation, as shown in FIG. 4, it is found that, for example, supposing that there are 10 gaps, a1, a2, a3, . . . , a10 in the respective layers of the cementite 18, cracks occur in the caulked portion 15 when the average value (a1+a2+a3+ . . . +a10)/10 is smaller than 0.15 μm. This average value is taken from 10 layer gaps of a1, a2, a3, . . . , a10 on one straight line that intersects 11 layers of cementite 18.

Based upon the results of the examinations, in order to prevent cracks from occurring in the caulked portion 15, the lower limit value of the average value of the layer gaps of the cementite 18 is set to 0.15 μm.

The following Table 1 shows the results of the examinations. In Table 1, the layer gap refers to an actual layer gap of the cementite 18 layers, the rate of crack initiation refers to the rate of crack initiation when the end portion of the hub shaft 2 is caulked, and the hardness refers to Rockwell C hardness (HRC) of the end portion of the hub shaft 2.

TABLE 1

| Layer gap (μm) | 0.1 | 0.15 | 0.2 | 0.35 | 0.4 |
|---|---|---|---|---|---|
| Rate of crack initiation (%) | 0.5 | 0 | 0 | 0 | 0 |
| Hardness (HRC) | 28 | 25 | 20 | 15 | 12 |

Table 1 shows that, when the inter-layer gap (lamella gap) of the cementite 18 in the pearlite 16 is 0.4 μm, the hardness of the hub shaft 2 becomes 12 HRC. Here, the hardness required for the hub shaft 2 of a rolling bearing device 1 of this type is preferably not less than 15 HRC. For this reason, the upper limit value of the average in the layer gap of the cementite 18 needs to be set to 0.35 μm.

From the reasons described above, the average value of the layer gaps of the cementite 18 is set in a range of not less than 0.15 μm to not more than 0.35 μm.

As described above, the average value of the layer gaps of the cementite 18 forming the pearlite 16 is preferably set in the range of not less than 0.15 μm to not more than 0.35 μm; thus, it becomes possible to prevent cracks from occurring when the end portion of the hub shaft 2 is caulked on the inner ring 3. Moreover, it is possible to provide a sufficient hardness for use as the hub shaft 2 of the rolling bearing device 1. Thus, it becomes possible to eliminate the necessity of disposing defective products, and consequently to improve the supply rate of the products.

The present invention is not limited to the embodiments, and various applications and modifications may be proposed.

(1) The following description will discuss a method in which the lamella gap of pearlite in the end portion of the hub shaft 2 is made greater than that in the other portions of the hub shaft 2, as in the case of the present invention.

Figure 5:
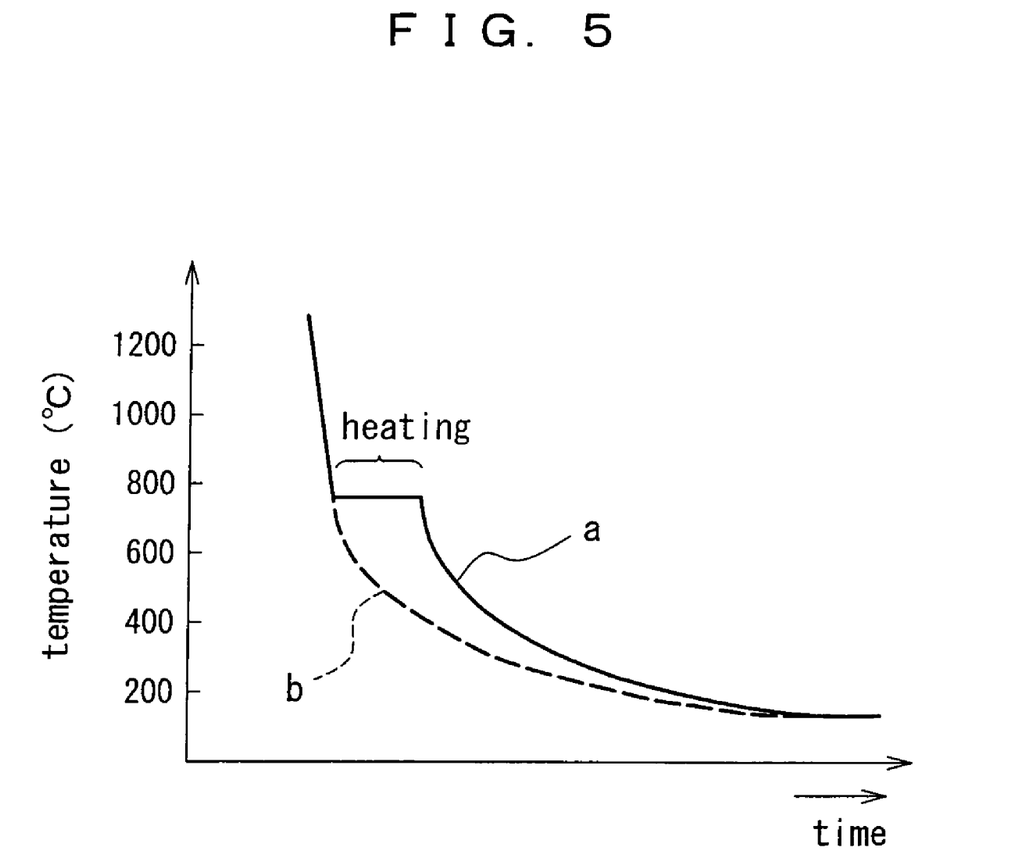
FIG. 5 is a graph showing a cooling characteristic in a hot forging process of the hub shaft.

To form the hub shaft 2, a base material is first molded through a hot forging process into a shape close to the final shape, and required portions such as a raceway surface are then subjected to a turning process to be formed into the final shape. The hub shaft 2 is heated to approximately 1200° C. when subjected to the hot-forging process, and cooled down after the completion of the forging process. See a cooling curve b in FIG. 5. During this cooling process, by cooling down only the end portion of the hub shaft 2 more slowly than the other portions of the hub shaft 2, the lamella gap of pearlite in the end portion of the hub shaft 2 is made greater than that of the other portions of the hub shaft 2. As a specific example, the following description will discuss a method in which the cooling rate of the shaft end portion is made slower by high-frequency heating only the shaft end portion of the hub shaft 2 during the cooling process. As shown in FIG. 5, at the time when, after the start of the cooling process, the temperature has dropped to 750° C., only the shaft end portion is high-frequency heated to make the cooling rate of the shaft end portion slower (cooling curve a) so that it becomes possible to make the lamella gap of the pearlite of the shaft end portion greater than that of the other portions of the hub shaft 2. Here, the temperature to which the shaft end portion is heated is adjusted in a range of about 750° C. to about 800° C. depending on the materials of the hub shaft 2.

Here, as an another methods for making the cooling rate of the shaft end portion slower, a method in which only the shaft end portion is covered with a thermal insulating material during the cooling process is proposed. The method for making the cooling rate of the shaft end portion slower in the present invention is not limited to the high-frequency heating process and thermal insulating material, and another methods may be used. In the embodiment, the lamella gap of the pearlite is widened by making the cooling rate of only the shaft end portion of the hub shaft 2 slower; however, the present invention is not limited to this method, and the cooling rate of the entire hub shaft 2 may be adjusted to widen the lamella gap of the pearlite in the entire hub shaft 2. As methods for widening the lamella gap of the pearlite in the entire hub shaft 2, the followings are proposed. The entire hub shaft 2 is temporarily heated by using high frequency waves and the like during the cooling process. In the cooling process, a heating furnace in which the cooling rate can be adjusted is used so as to gradually cool the material. The entire hub shaft 2 is covered with a heat insulating material and cooled down gradually.

Figure 6:
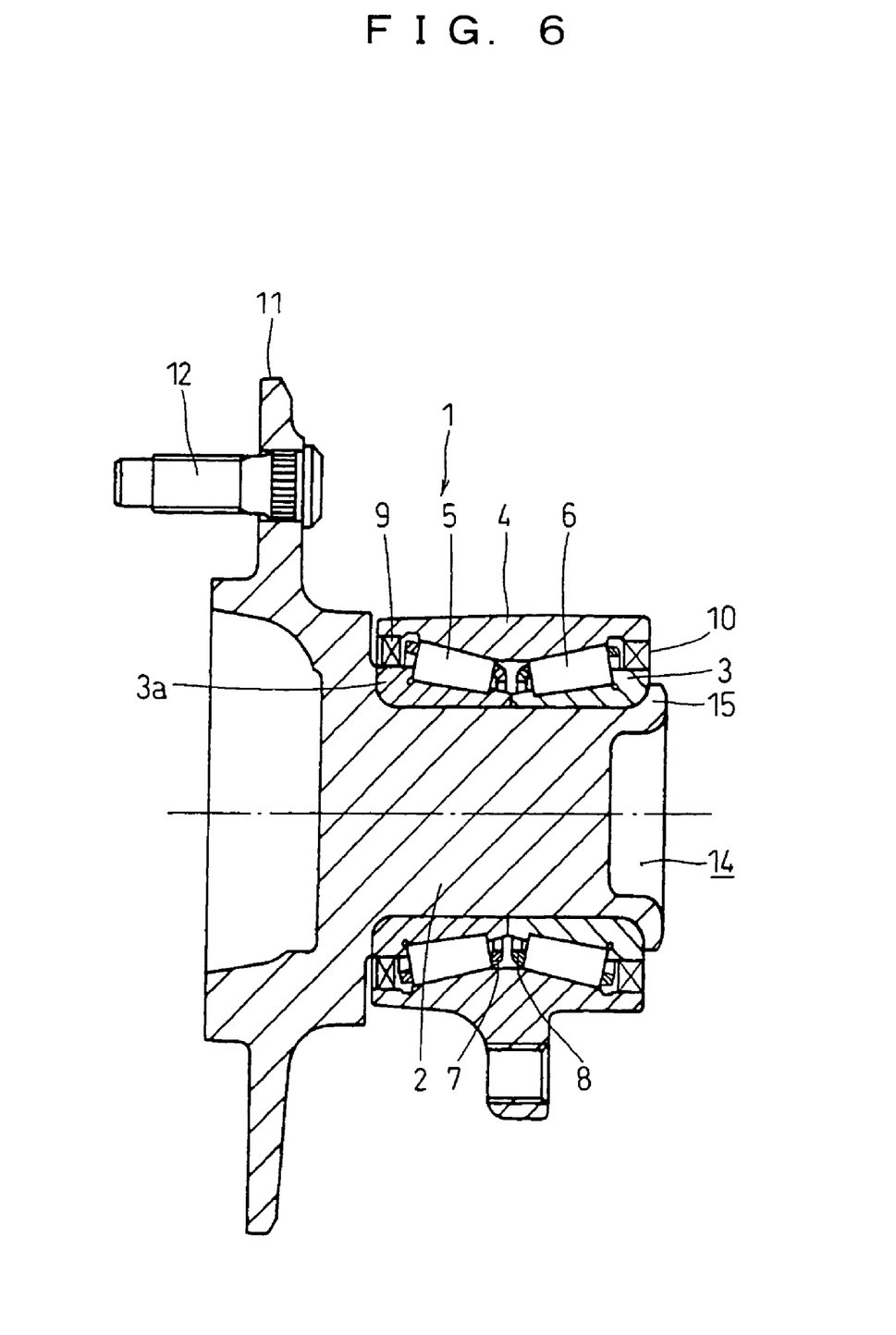
FIG. 6 is a cross-sectional view illustrating a schematic structure of a rolling bearing device in accordance with another preferred embodiment of the present invention.

(2) In the present invention, as shown in FIG. 6, both of the inner ring members of the rolling bearing device 1 may be formed by the inner rings 3 and 3a themselves. In this case, since the end portion of the hub shaft 2 is caulked onto the end face of the inner ring 3, the shaft body is formed by the hub shaft 2, and the bearing ring is formed by the inner ring 3. In FIG. 6, those members that are the same as those of FIG. 1 are indicated by the same reference numerals. In the present embodiment, one portion of the roller bearing is compatibly used as the hub shaft 2 so that the hub shaft and the roller bearing are integrated.

In this case also, as shown in FIG. 4, the average value of the layer gaps of the cementite 18 constituting the pearlite 16 in the caulked portion 15 is set in a range from not less than 0.15 μm to not more than 0.35 μm. Thus, it becomes possible to prevent cracks from occurring in the caulked portion 15 when the end portion of the hub shaft 2 is caulked onto the inner ring 3. Moreover, it is possible to provide a sufficient hardness for use as a hub shaft 2 of a rolling bearing device 1. Thus, it becomes possible to eliminate the necessity of disposing defective products, and consequently to improve the supply rate of the products.

Figure 7:
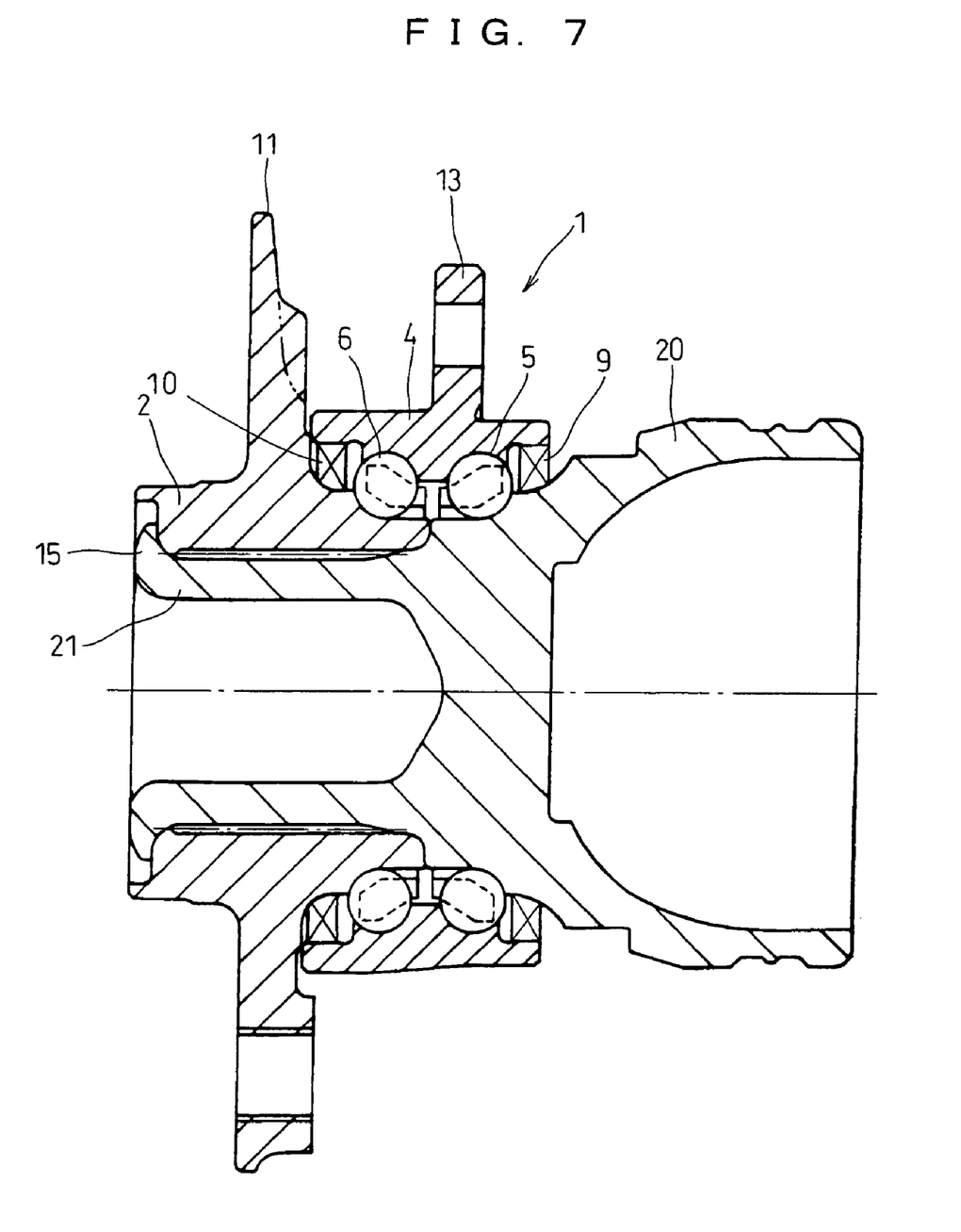
FIG. 7 is a cross-sectional view illustrating a schematic structure of a rolling bearing device in accordance with still another preferred embodiment of the present invention.

(3) As shown in FIG. 7, the present invention is also applied to a rolling bearing device 1 on the driving ring side. In this rolling bearing device 1, inner ring members are rotatably supported through balls 5 and 6 on an outer ring member 4 that is non-rotatably supported on the vehicle side. One of the inner ring members is a bowl-shaped outer ring member 20 of a constant velocity joint, and the other inner ring member is a hub shaft (in this case, a hub wheel) 2. The end portion of the shaft body 21 that is integrally formed in the bowl-shaped outer ring member 20 of the constant velocity joint is caulked onto the end face of the hub shaft 2. Those portions in FIG. 7 that are the same as those of FIG. 1 are indicated by the same reference numerals.

In this case also, as shown in FIG. 4, the average value of the layer gaps of the cementite 18 constituting the pearlite 16 in the caulked portion 15 is set in a range from not less than 0.15 μm to not more than 0.35 μm. Thus, it becomes possible to prevent cracks from occurring in the caulked portion 15 when the end portion of the hub shaft 2 is caulked onto the inner ring 3. Moreover, it is possible to provide a sufficient hardness for use as a hub shaft 2 of a rolling bearing device 1. Thus, it becomes possible to eliminate the necessity of disposing defective products, and consequently to improve the supply rate of the products.

(4) The present invention is also applied to a rolling bearing except for the double row angular contact ball bearing with vertex of contact angles outside of bearing. With respect to the rolling bearing, except for the double row bearing, the present invention may be applied to, for example, a single row rolling bearing.

(5) The present invention includes a case in which the shaft body of a rolling bearing device is formed as an cylinder member placed on the outside the outer ring member in the radial direction, with the end portion of the cylinder member being caulked onto the end portion of the outer ring member that serves as the bearing ring. With respect to the cylinder member, for example, a housing or the like is proposed.

(6) In the above-mentioned embodiment, upon calculating the average value of the layer gaps of the cementite 18, the average value of 10 gaps in the cementite 18 layers is obtained, and the average value (a1+a2+a3+ . . . +a10)/10 is set in a range from not less than 0.15 μm to not more than 0.35 μm. However, the present invention is not limited to this setting. In other words, the average value of n-number of gaps in the cementite 18 layers may be obtained, and the average value (a1+a2+a3+ . . . +an−1+an)/n may be set in a range from not less than 0.15 μm to not more than 0.4 μm, or in a range from not less than 0.15 μm to not more than 0.35 μm. In this case also, it becomes possible to prevent cracks from occurring in the caulked portion 15 when the end portion of the hub shaft 2 is caulked onto the inner ring 3. Moreover, it is possible to provide a sufficient hardness for use as a hub shaft 2 of a rolling bearing device 1. Thus, it becomes possible to eliminate the necessity of disposing defective products, and consequently to improve the supply rate of the products.

As described above, in accordance with the present invention, when the end portion of the shaft body is caulked onto a bearing ring, it is possible to prevent cracks from occurring in the caulked portion, and consequently to improve the supply rate of the products.

INDUSTRIAL APPLICABILITY

The bearing device of the present invention is suitably applied to axles of various vehicles such as automobiles, train vehicles and aircrafts.

The invention claimed is:
1. A bearing device comprising:
a bearing ring;
a shaft body having a cylindrical portion that is made of carbon steel including pearlite having a cementite layer structure, and the cylindrical portion having an end portion caulked onto the bearing ring; and
said shaft body being processed to provide, at least in the end portion of the cylindrical portion of the shaft body, a lamella layer gap of the cementite in the pearlite made greater in thickness than a layer gap outside of the end portion, wherein the shaft body is processed such that a set of characteristics is provided in the end portion, wherein:
the characteristics include:
the end portion of the shaft body having an average value of the lamella layer gaps of the cementite in a range from 0.2 μm to not more than 0.35 μm,
the carbon steel having a carbon content in a range from not less than 0.37% to not more than 0.65%, and
the end portion of the shaft body having a hardness of in the range of 20 HRC down to but not less than 15 HRC.

2. The bearing device according to claim 1, wherein the carbon steel has a carbon range of 0.52% to 0.58%, is in the range of 0.15% to 0.25%, Mn in the range of 0.60% to 0.90%, P in the range of 0.30% or less and S in the range of 0.035% or less.

3. The bearing device according to claim 1, wherein the average value of the lamella layer gaps of the cementite is set in a range from not less than 0.15 μm to not more than 0.23 μm.

4. The bearing device according to claim 3, wherein the carbon steel has a carbon range of 0.52% to 0.58%, is in the range of 0.15% to 0.25%, Mn in the range of 0.60% to 0.90%, P in the range of 0.030% or less and S in the range of 0.035% or less.

5. The bearing device according to claim 1 wherein:
the end portion of the shaft body cylinder shaped as part of the cylindrical portion prior to caulking and which is deformed when caulked to the bearing ring;
said shaft body processed to provide a set of characteristics in only the end portion of the shaft body and not in a remainder of the shaft body such that the end portion has a lower hardness than the remainder of the shaft body and has a gap spacing in the range of 0.15 to 0.35 μm only in the end portion, the range of spacing being greater than that in a remainder of the shaft body; and
the end portion is increased in diameter by said caulking so as to engage an outer end face of the bearing ring.

6. A manufacturing method of a bearing device comprising the steps of:
forming a shaft body of carbon steel, having pearlite, such that the shaft body has a cylindrical portion having an end portion to be caulked onto a bearing ring, said forming of the shaft body being done by a hot forging process; and
cooling the end portion of the shaft body, wherein in a cooling process, by adjusting a cooling rate in at least the end portion, lamella layer gaps of cementite contained in pearlite as layers forming a cementite layer structure are set to be greater in thickness than layer gaps outside of the end portion such that a set of characteristics is provided in the end portion, wherein:
said characteristics include:
the end portion of the shaft body having an average value of the lamella layer gaps of the cementite in a range from 0.2 μm to not more than 0.35 μm,
the carbon steel having a carbon content in a range from not less than 0.37% to not more than 0.65%, and
the end portion of the shaft body having a hardness of in the range of 20 HRC down to but not less than 15 HRC; and
installing the bearing ring on said end portion and caulking said end portion to secure the bearing ring.

7. The manufacturing method of a bearing device according to claim 6, wherein in the cooling process, at least the end portion is high-frequency heated to adjust the cooling rate so that the lamella layer gaps of cementite contained in the pearlite as layers are set to be greater in thickness than the layer gaps outside of the end portion.

8. The manufacturing method of a bearing device according to claim 6, wherein in the cooling process, at least the end portion is high-frequency heated to be temporarily maintained at not less than 750° C. so that the cooling rate is adjusted.

9. The method according to claim 6, wherein the carbon steel has a carbon range of 0.52% to 0.58%, is in the range of 0.15% to 0.25%, Mn in the range of 0.60% to 0.90%, P in the range of 0.030% or less and S in the range of 0.35% or less.

10. A manufacturing method of a bearing device comprising the steps of:
forming a shaft body of carbon steel, having pearlite, such that the shaft body has a cylindrical portion having an end portion to be caulked onto a bearing ring, said forming of the shaft body being done by a hot forging process; and cooling the shaft body, wherein in a cooling process, by adjusting a cooling rate in at least the end portion, lamella layer gaps of cementite contained in the pearlite as lamella layers forming a cementite layer structure in the shaft body are set in thickness relative to layer gaps outside the end portion so as to prevent cracks from occurring in the end portion when the end portion is caulked onto the bearing ring such that a set of characteristics is provided in the end portion, wherein:

said set of characteristics includes:

the end portion of the shaft body having an average value of the lamella layer gaps of the cementite in a range from 0.2 μm to not more than 0.35 μm, the carbon steel having a carbon content in a range from not less than 0.37% to not more than 0.65%, and the end portion of the shaft body having a hardness of in the range of 20 HRC down to but not less than 15 HRC; and installing the bearing ring on said end portion and caulking said end portion to secure the bearing ring.

11. The method according to claim 10, wherein the carbon steel has a carbon range of 0.52% to 0.58%, is in the range of 0.15% to 0.25%, Mn in the range of 0.60% to 0.90%, P in the range of 0.30% or less and S in the range S of 0.35% or less.

* * * * *